United States Patent [19]

Nishizawa et al.

[11] Patent Number: 5,021,936

[45] Date of Patent: Jun. 4, 1991

[54] PWM POWER CONVERTER USING MIXED BIPOLAR AND STATIC INDUCTION TRANSISTORS

[75] Inventors: Jun-ichi Nishizawa; Takashige Tamamushi; Koichi Mitamura, all of Sendai; Hiroo Takahashi, Izumi; Kiyoo Mitsui, Sendai; Mitsuo Ikehara, Izumi; Toyota Wakō; Sinpei Maruyama, both of Sendai, all of Japan

[73] Assignees: Zaidan Hojin Handotai Kenkyu Sinkokai; Tohoku Electric Power Company, Incorporated; Tsuken Electric Ind. Co., Ltd., all of Sendai, Japan

[21] Appl. No.: 545,148

[22] Filed: Jun. 28, 1990

Related U.S. Application Data

[63] Continuation of Ser. No. 380,516, Jul. 17, 1989, abandoned, which is a continuation of Ser. No. 172,598, Mar. 24, 1988, abandoned.

[30] Foreign Application Priority Data

| Mar. 24, 1987 | [JP] | Japan | 62-69639 |
| Mar. 24, 1987 | [JP] | Japan | 62-69640 |
| Oct. 6, 1987 | [JP] | Japan | 62-252180 |

[51] Int. Cl.$^5$ ............................................. H02M 7/48
[52] U.S. Cl. ......................................... 363/41; 363/132
[58] Field of Search ........................ 363/41, 42, 98, 132

[56] References Cited

U.S. PATENT DOCUMENTS

| 3,820,003 | 6/1974 | Trappeiner et al. | 363/41 |
| 4,213,103 | 7/1980 | Birt | 363/132 |
| 4,419,615 | 12/1983 | Muto et al. | 318/811 |
| 4,480,299 | 10/1984 | Muto et al. | 363/41 |
| 4,489,371 | 12/1984 | Kernick | 363/98 |
| 4,523,268 | 6/1985 | Brajder et al. | 363/98 |
| 4,546,422 | 10/1985 | Okado | 363/41 |
| 4,719,551 | 1/1988 | Nishizawa et al. | 363/41 |

FOREIGN PATENT DOCUMENTS

| 41729 | 4/1978 | Japan | 363/132 |
| 60-174069 | 9/1985 | Japan . |
| 61-81180 | 4/1986 | Japan . |

OTHER PUBLICATIONS

Nishizawa et al., "Low Distortion, High Efficiency and High Carrier Frequency, Static Induction Transistor (SIT) etc.", IEEE Publication, (1986), pp. 623-629.

*Primary Examiner*—William H. Beha, Jr.
*Attorney, Agent, or Firm*—Oblon, Spivak, McClelland, Maier & Neustadt

[57] ABSTRACT

This invention relates to a PWM power converter for switching a plurality of bridge-connected semiconductor switching elements based on PWM signals. As the semiconductor switching elements, elements with a low ON voltage and small conduction loss, and elements with a small switching loss and capable of high-speed switching are combined to improve power conversion efficiency.

4 Claims, 18 Drawing Sheets

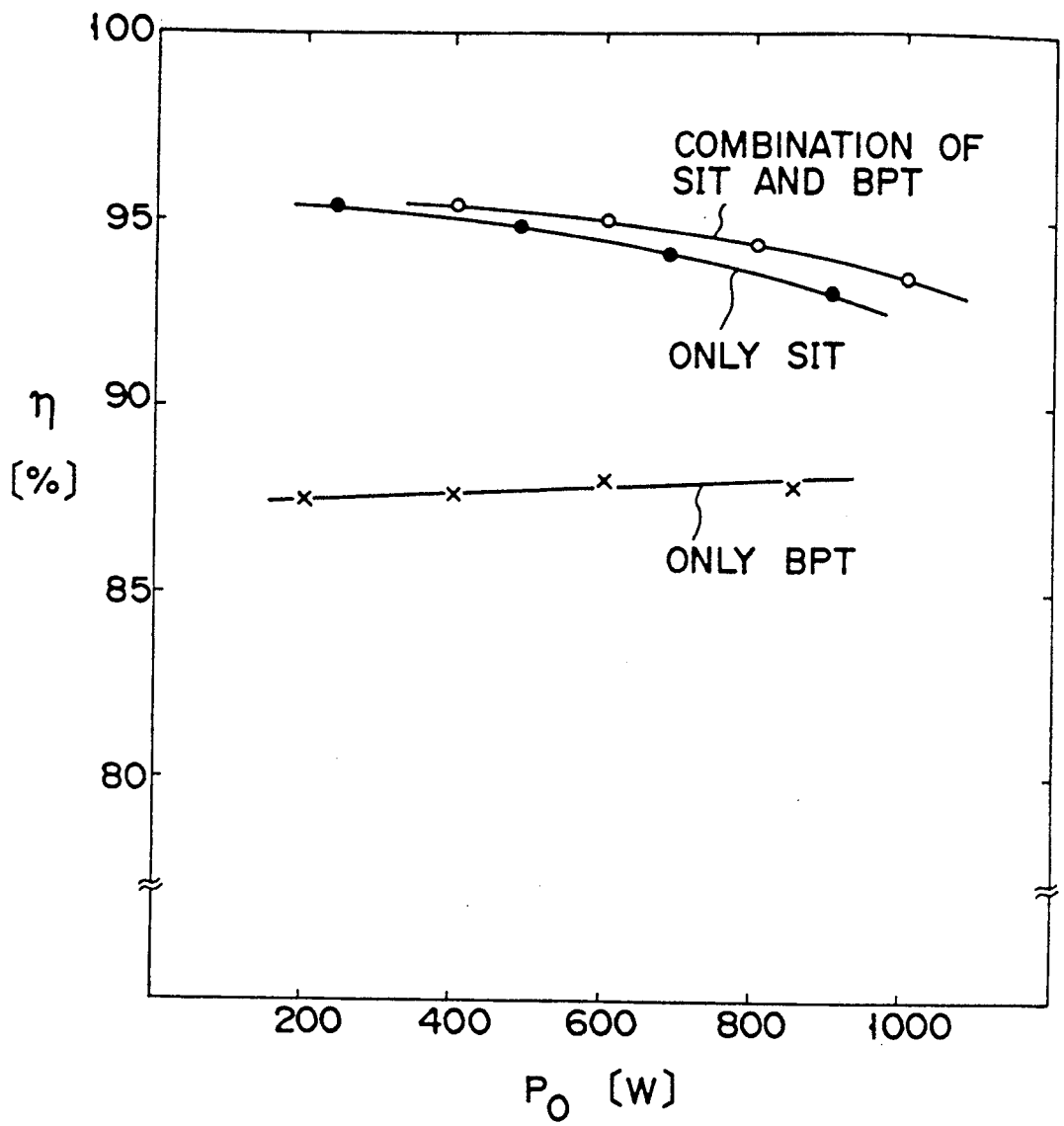
F I G. 6

PWM POWER CONVERTER USING MIXED BIPOLAR AND STATIC INDUCTION TRANSISTORS

This application is a continuation of U.S. Application Ser. No. 07/380,516 filed July 17, 1989, now abandoned, which is a continuation of U.S. Pat. Application Ser. No. 07/172,598 filed Mar. 24, 1988, also abandoned.

BACKGROUND OF THE INVENTION

1. Field of the Invention

The present invention relates to an improvement of a PWM (pulse width modulation) power converter with high power conversion efficiency such as an inverter, a converter, a forward-reverse power converter, an active filter, and the like, which is arranged such that a plurality of bridge-connected switching elements are driven based on a PWM signal.

2. Description of the Related Art

As is known, a plurality of bridge-connected switching elements are driven based on a PWM signal, and a PWM power converter with high power conversion efficiency, such as an inverter, a converter, a forward-reverse power converter, an active filter, and the like can be constituted.

The switching elements used in the PWM power converter include relatively low-speed power self-extinction type elements such as BPTs (bipolar transistors), GTOs (gate turn-off thyristors), and the like. The modulation frequency for PWM falls within the range of 500 Hz to 2 kHz, and a PWM pulse count falls within the range of several pulses to pulses between 10 and 20. The modulation frequency for PWM falls within the range of 500 Hz to 2 kHz, and the PWM pulse count consists of a combination of relatively long pulses, e.g., several pulses to pulses between 10 and 20.

However, in a PWM waveform consisting of a pulse train of long pulses, in order to maintain an input or output signal waveform of a power converter to be a sine wave, a filter using an LC resonance circuit consisting of coil L having a large reactance and capacitor C having a large capacitance is necessary.

In particular, an active filter for a PWM waveform consisting of a pulse train of long pulses between 10 and 20 can only function up to harmonics of lower orders. Thus, a demand has arisen for an active filter which can function up to harmonics of higher orders.

Recently, high-speed power switching elements such as SIT (static induction transistors), SI thyristors (static induction thyristors), and the like are available. For this reason, a modulation frequency for PWM can be set to be several tens of kHz, and a PWM pulse count can be obtained by combining several hundreds of short pulses.

Since the modulation frequency for PWM is increased, an input or output signal waveform of a power converter can be a sine wave free from distortion, and an active filter can function up to harmonics of higher orders.

However, in a high-frequency PWM power converter with an increased modulation frequency for PWM, the following problem is posed. As the modulation frequency is increased, a switching loss of each switching element is increased, and power conversion efficiency is reduced. More specifically, a self-extinction type power high-speed switching element has a trade-off relation between its switching time and ON voltage. For this reason, in a conventional high-frequency PWM power converter, elements capable of high-speed operation are used as switching elements at the cost of ON resistances of switching elements which are used for increasing a modulation frequency.

As a result, the modulation frequency of the PWM power converter is increased, while power conversion efficiency is degraded due to high ON resistances of switching elements used. Thus, high power conversion efficiency is not obtained. In other words, use of high-speed switching elements allows a decrease in switching loss but causes an increase in conduction loss. Therefore, conversion efficiency as a whole is limited.

Note that semiconductor switching elements include MOS (metal oxide semiconductor) transistors, IGBTs, and the like in addition to the BPTs, GTOs, SITs, SI thyristors and the like described above.

A dead time is set between adjacent high-frequency PWM signals supplied to bridge-connected switching elements in order to prevent the elements series-connected to a DC power supply from being simultaneously turned on. A rate of a decrease in pulse width (lean of a pulse width) of the PWM signal due to the dead time largely affects an output signal waveform more than a case of a PWM signal consisting of a pulse train of long pulses. Thus, fidelity of an output signal waveform with respect to an input signal waveform is impaired.

When a high-frequency PWM signal with an increased modulation frequency is used, pulse dropout occurs in a crest region and a zero-crossing region of an output signal waveform. Thus, the fidelity of the output signal waveform with respect to the input signal waveform is also impaired in the crest region and the zero-crossing region of the output signal waveform.

SUMMARY OF THE INVENTION

The present invention has been made in consideration of the above situation and has as its object to provide a PWM power converter which can perform a power conversion operation with small loss and high efficiency since all loses generated in switching elements are reduced.

It is a second object of the present invention to provide a PWM power converter which can eliminate an adverse influence to an output signal waveform caused by a decrease in pulse width of a high-frequency PWM signal due to a dead time, and can obtain an output signal waveform having high fidelity with respect to an input signal waveform.

It is a third object of the present invention to provide a PWM power converter which can prevent pulse dropout in a crest region and a zero crossing region of an output signal waveform caused by use of a high-frequency PWM signal, and can maintain fidelity of an output signal waveform with respect to an input signal waveform in the crest region and the zero-crossing region.

According to one aspect of the present invention, there is provided a PWM power converter comprising:

a plurality of bridge-connected semiconductor switching elements; and

PWM signal generating means for generating PWM signals for switching said plurality of semiconductor switching elements, respectively, wherein a first element which has a structure with a low ON voltage and a small conduction loss is used for ones of said plurality of semiconductor switching elements, which are switched at a low speed, and a second element which has a structure with a small switching loss and capable of high-speed switching is used for the remaining ones of said plurality of semiconductor switching elements, which are switched at a high speed.

According to another aspect of the invention, there is provided a PWM power converter comprising:

a plurality of bridge-connected semiconductor switching elements;

PWM signal generating means for comparing levels of a signal wave and a modulated wave and generating PWM signals for switching said plurality of semiconductor switching elements, respectively;

dead-time setting means for adding a dead time to each PWM signal generated by said PWM signal generating means so that elements, connected in series with a power supply, of said plurality of semiconductor switching elements are not simultaneously turned on; and level shift means for providing a DC level difference to the signal wave and the modulated wave.

According to a further aspect of the invention, there is provided a PWM power converter comprising:

a plurality of bridge-connected semiconductor switching elements;

PWM signal generating means for comparing levels of a signal wave and a modulated wave and generating PWM signals for switching said plurality of semiconductor switching elements, respectively; and dead-time setting means for adding a dead time to each PWM signal generated by said PWM signal generating means so that elements, connected in series with a power supply, of said plurality of semiconductor switching elements are not simultaneously turned on, wherein said switching elements are operated in a range where a minimum pulse width of the PWM signal defined by a depth of modulation and the modulation frequency is not decreased below a minimum pulse width of the PWM signal defined by a turn-on time, a turn-off time, and a dead time of said switching elements.

Figure 4:
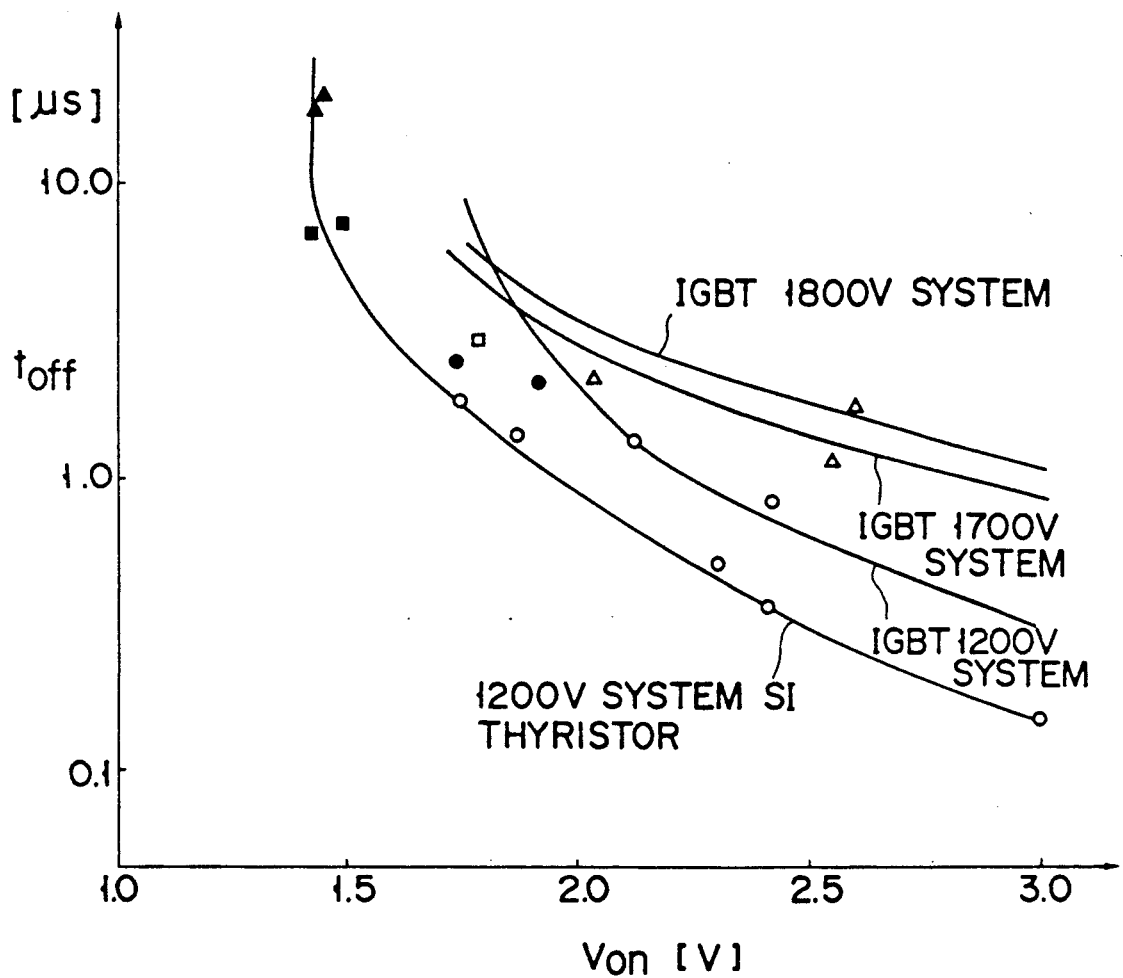
Figure 5A:
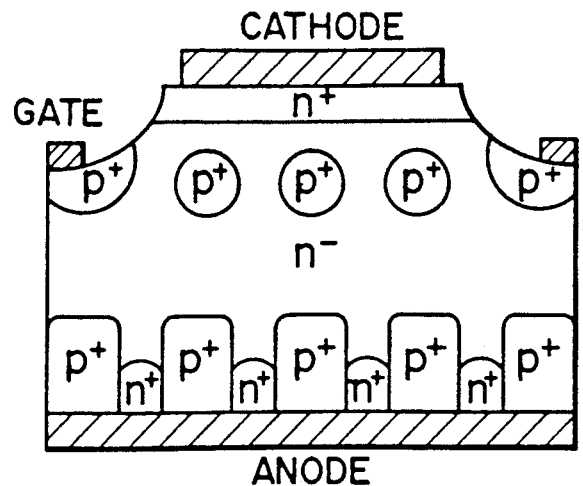
Figure 5B:
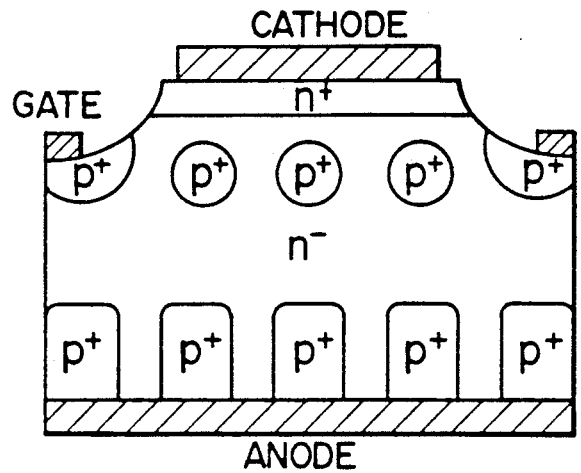
Figure 5C:
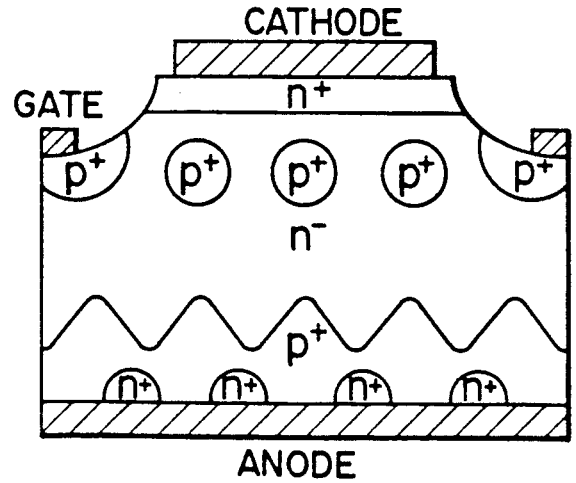
Figure 5D:
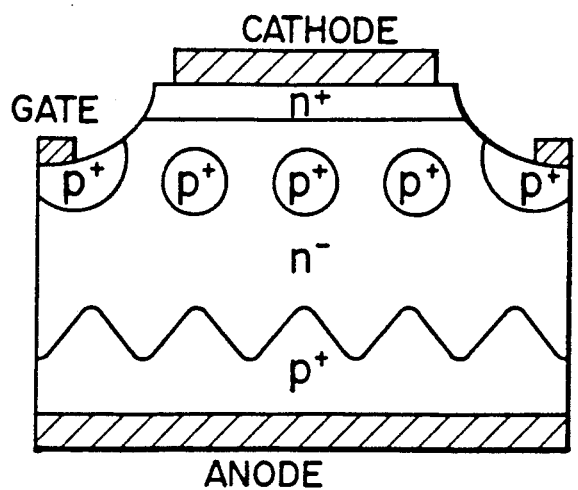
Figure 5E:
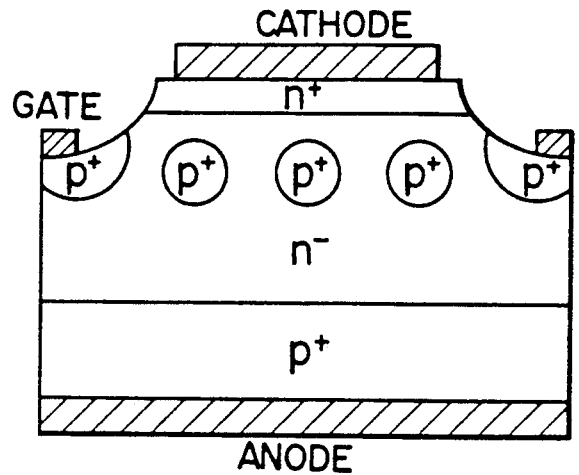
Figure 5F:
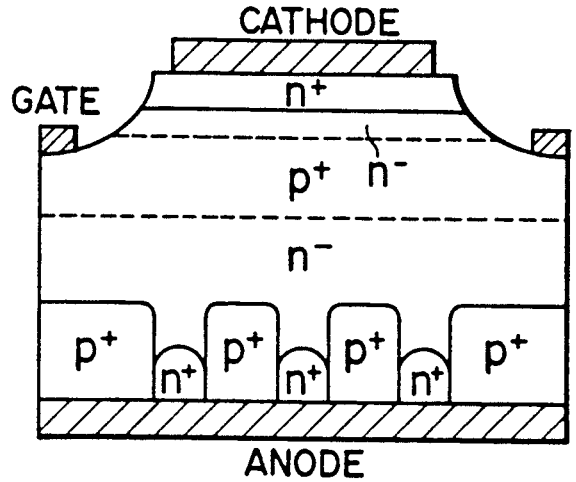
Figure 7:
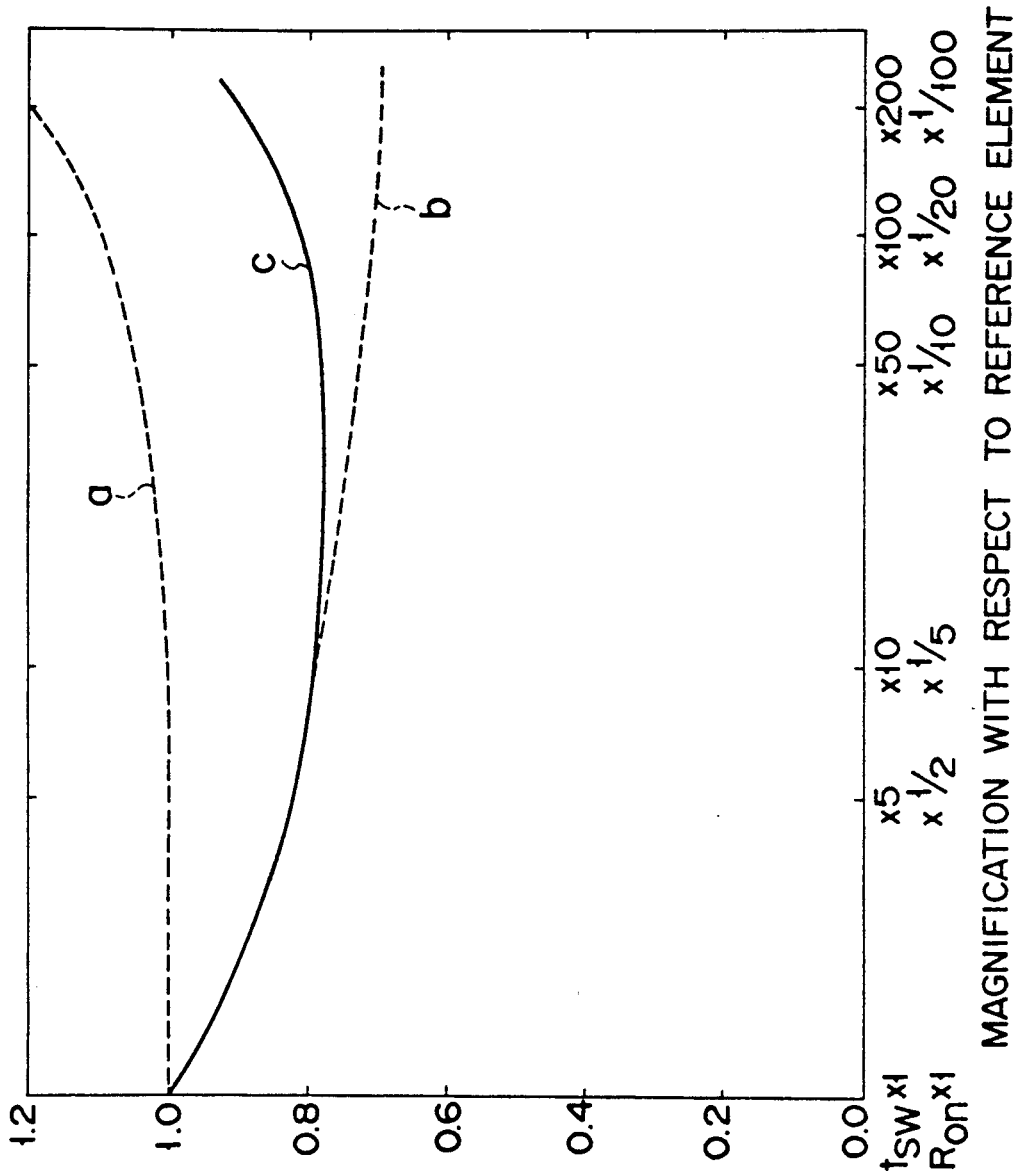
Figure 8:
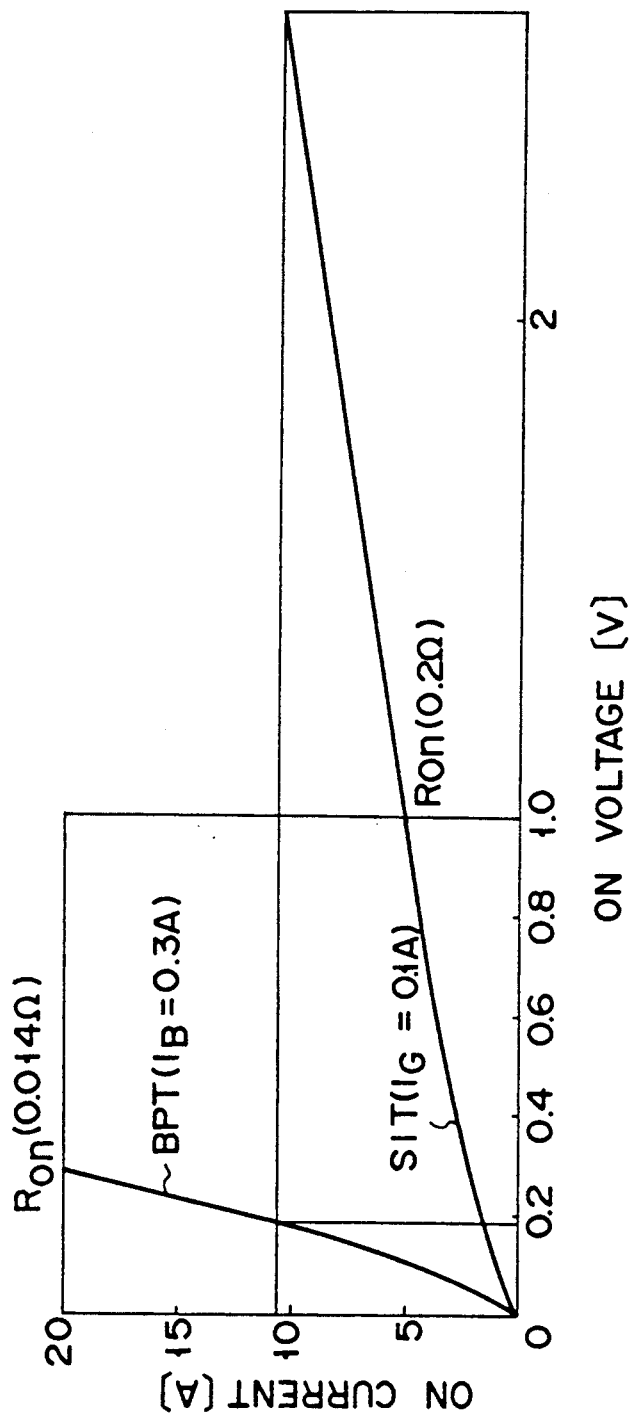
Figure 9:
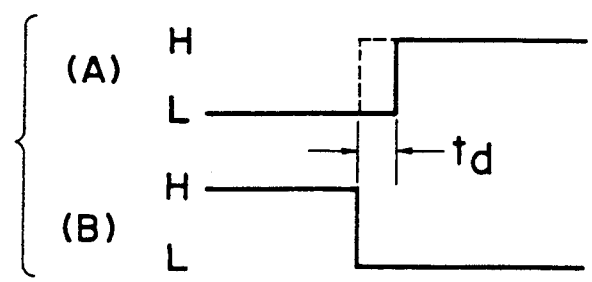
Figure 10:
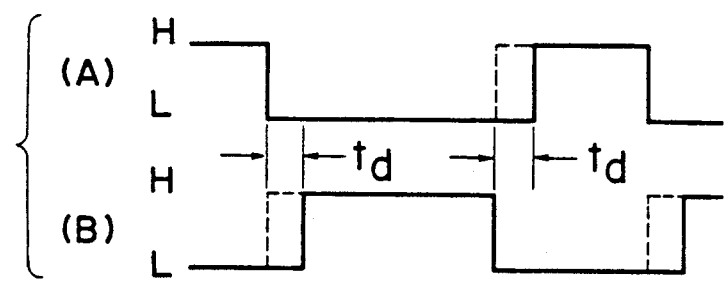
Figure 11:
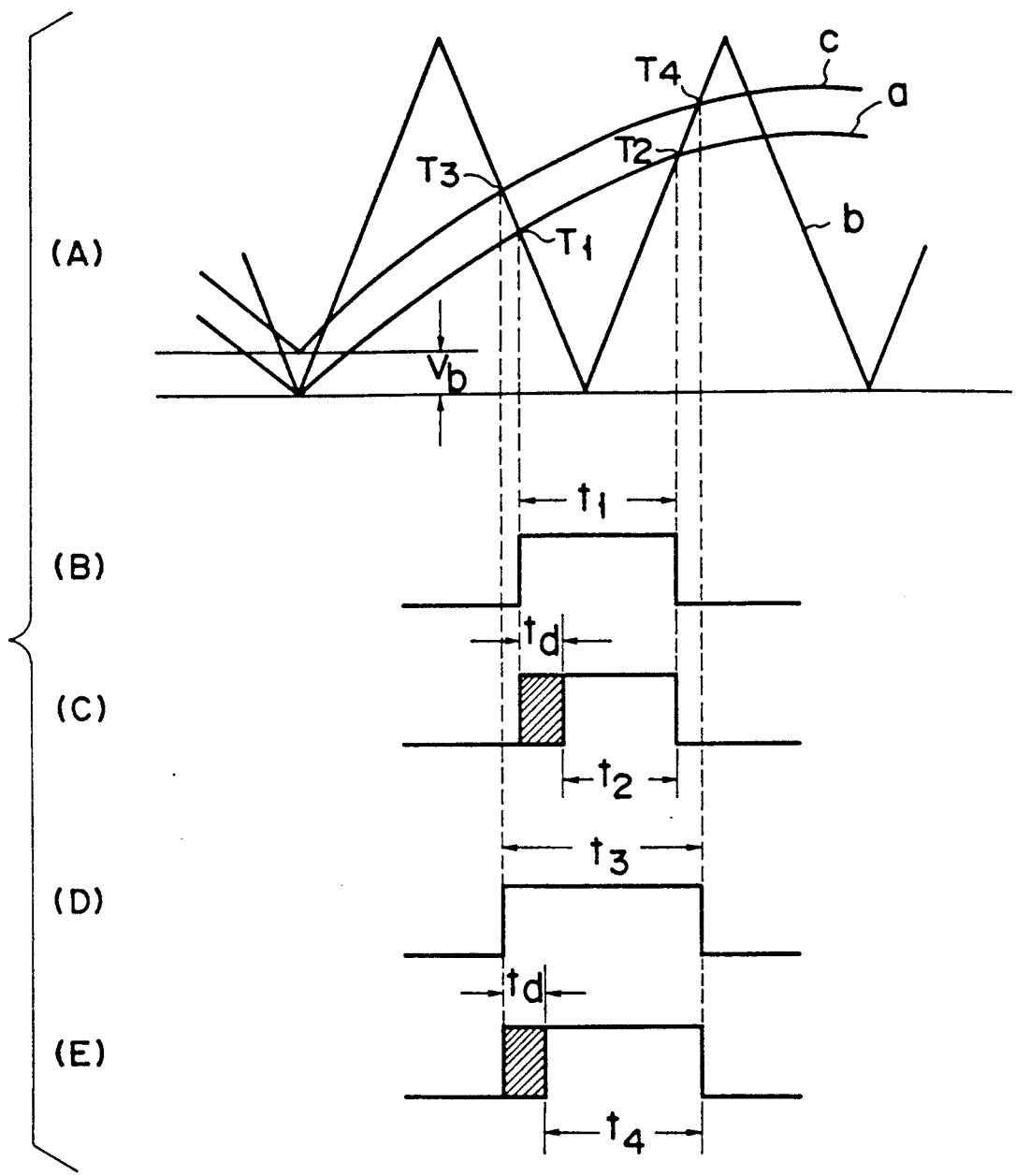
Figure 12:
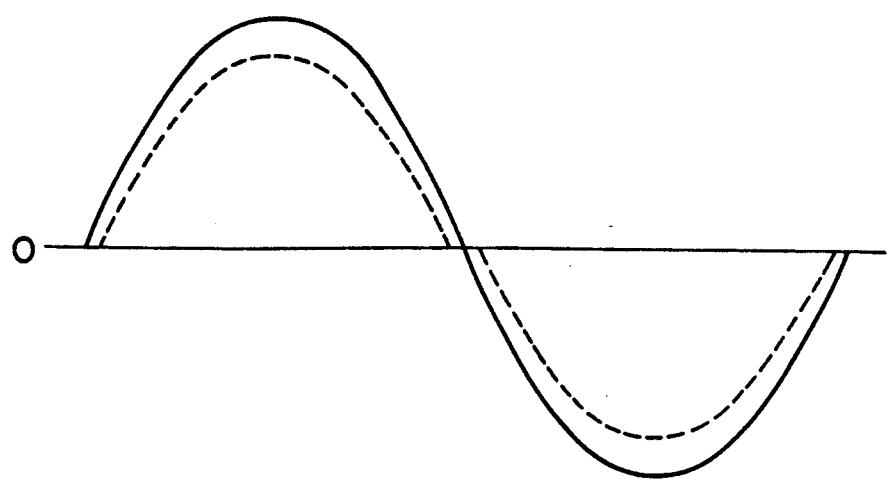
Figure 13:
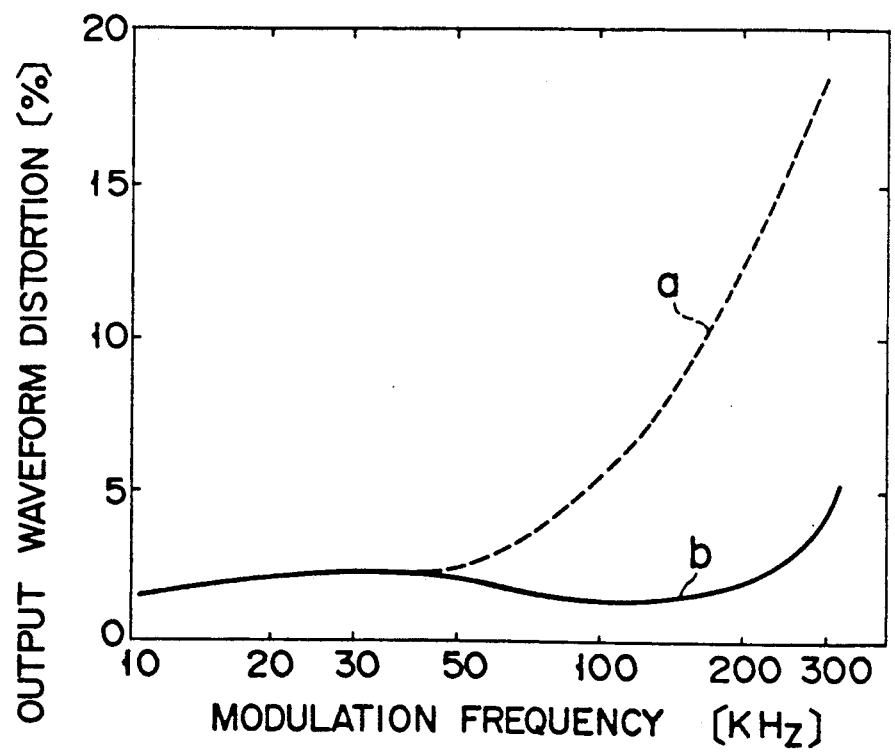
Figure 14:
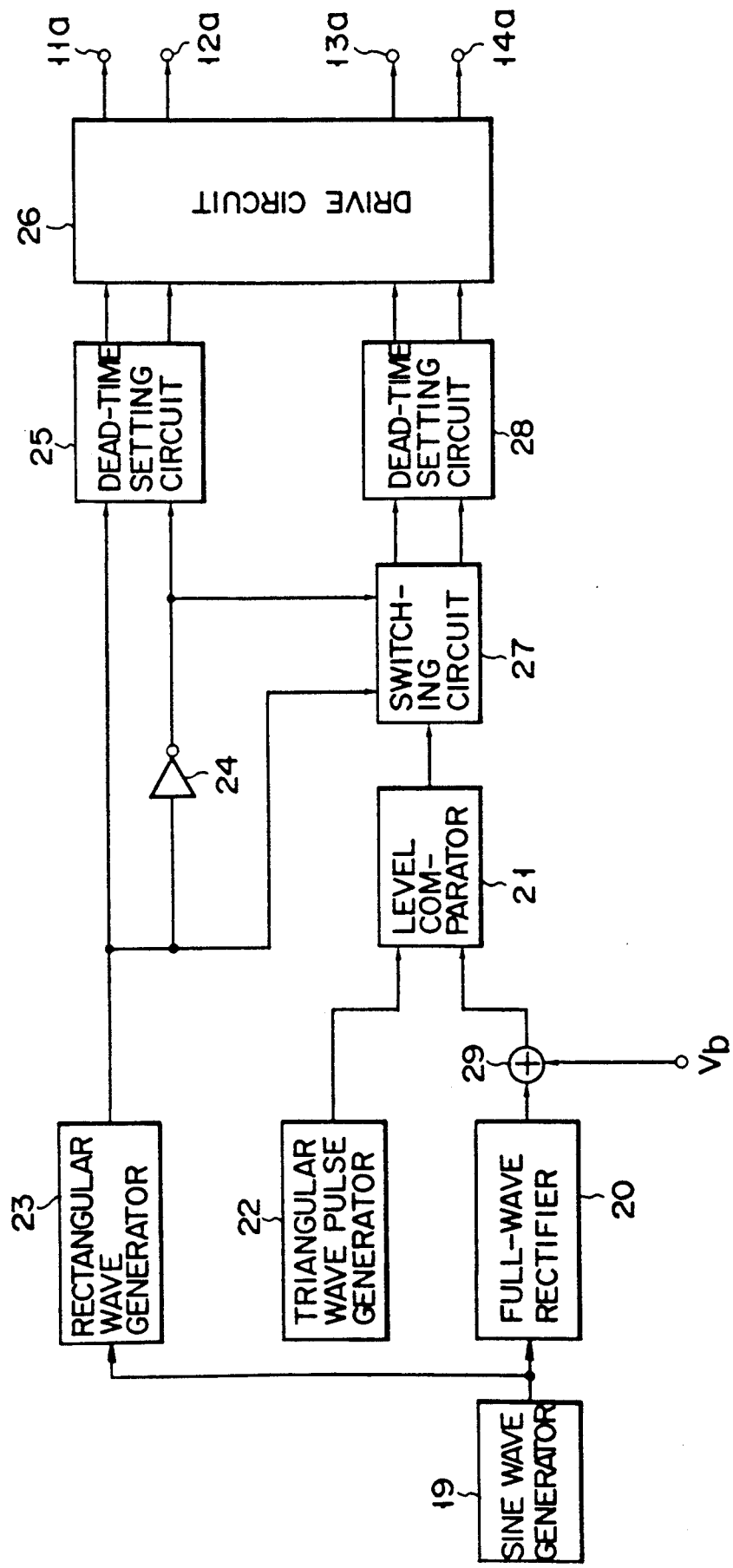
Figure 15:
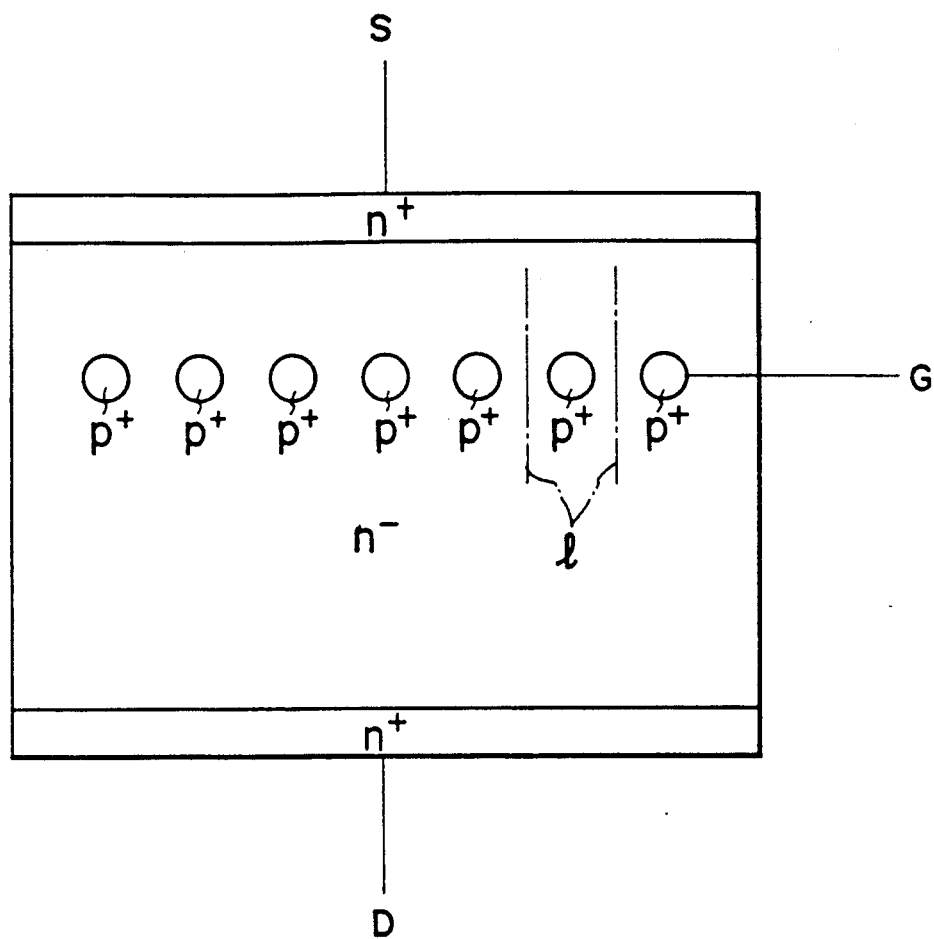
Figure 16:
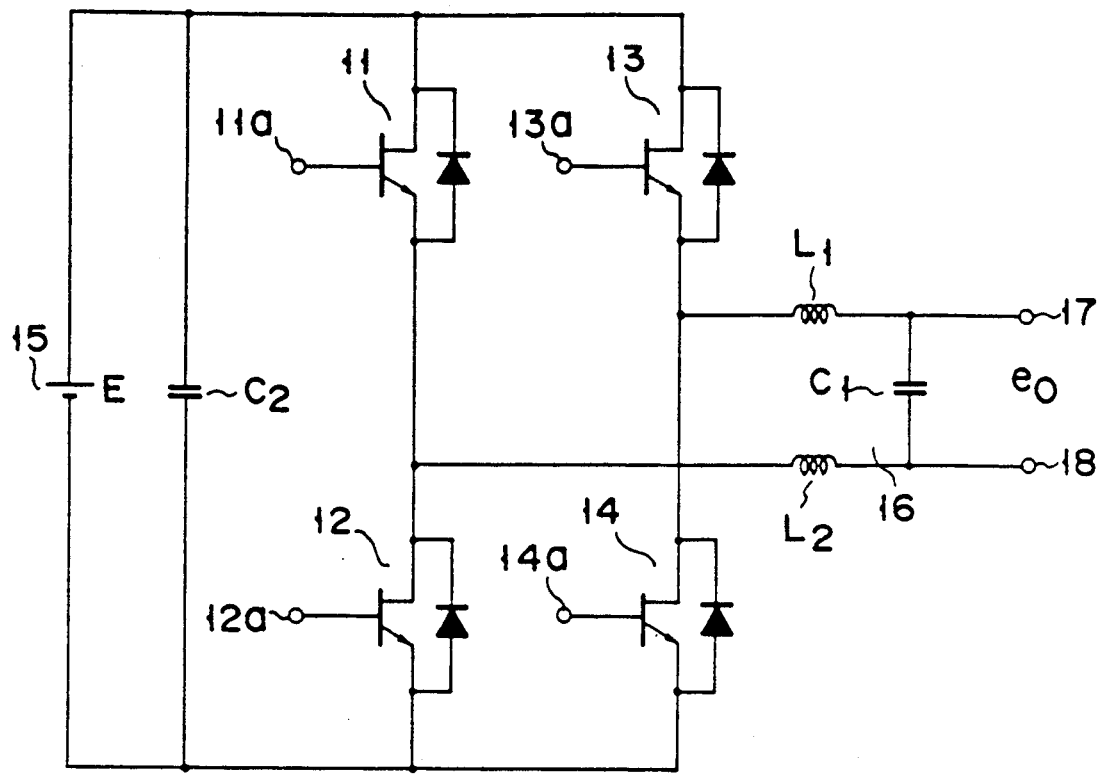
Figure 17:
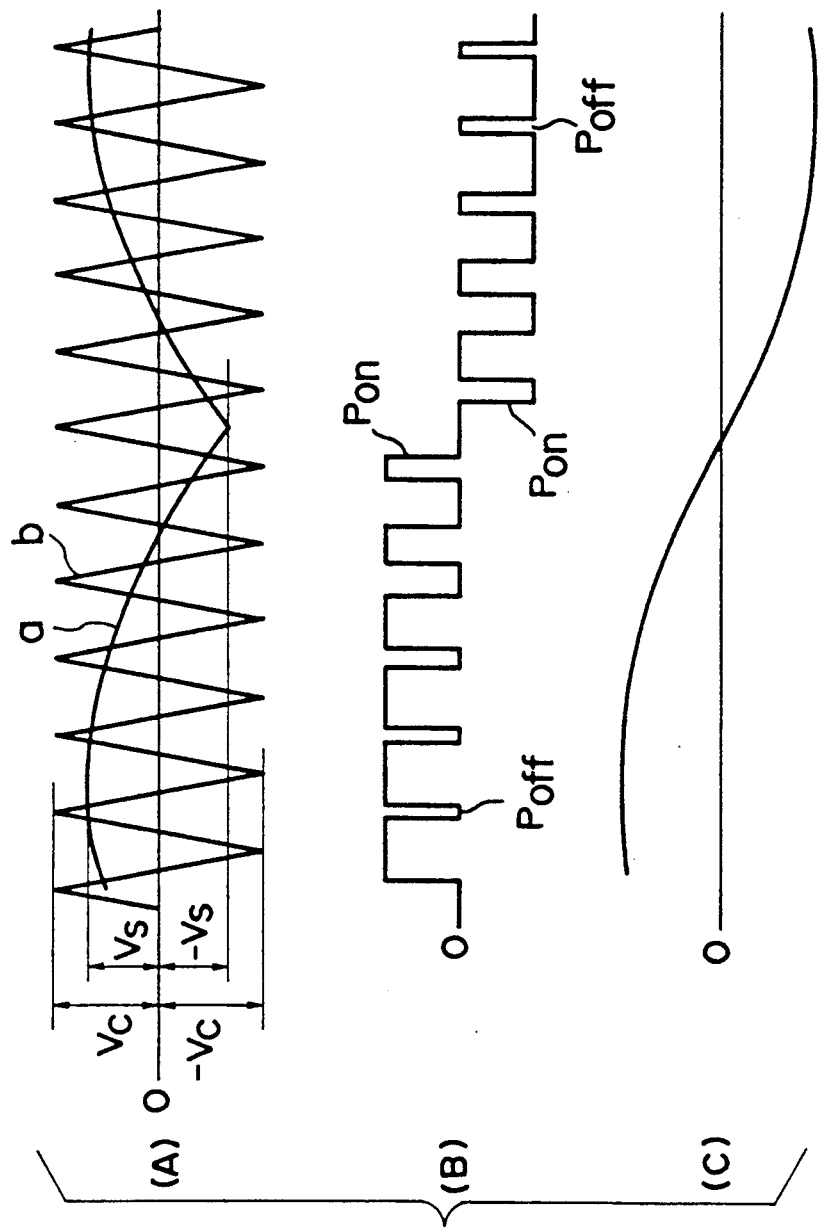
Figure 18:
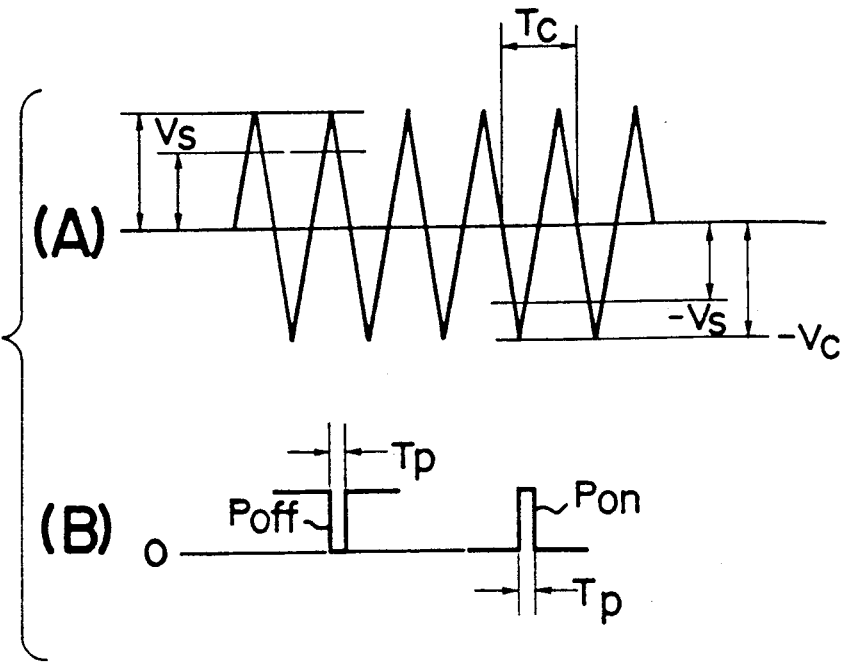
Figures 19A, 19B:
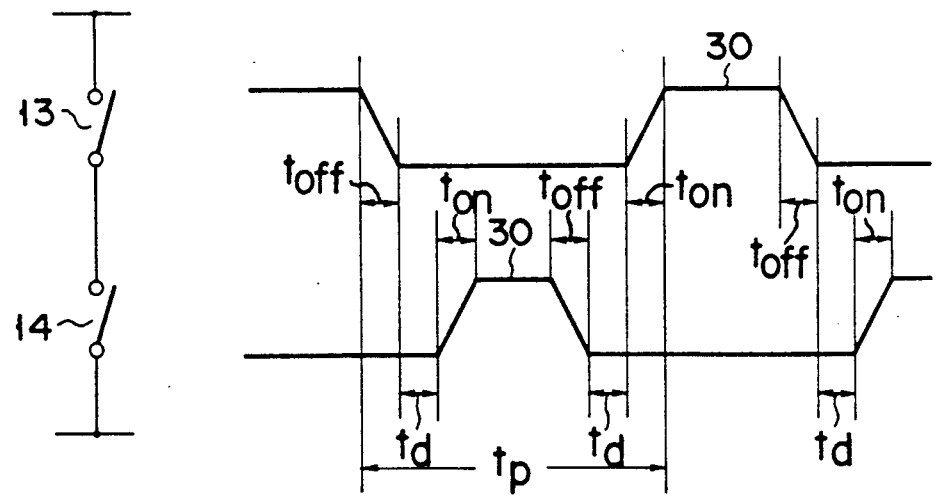
Figure 20:
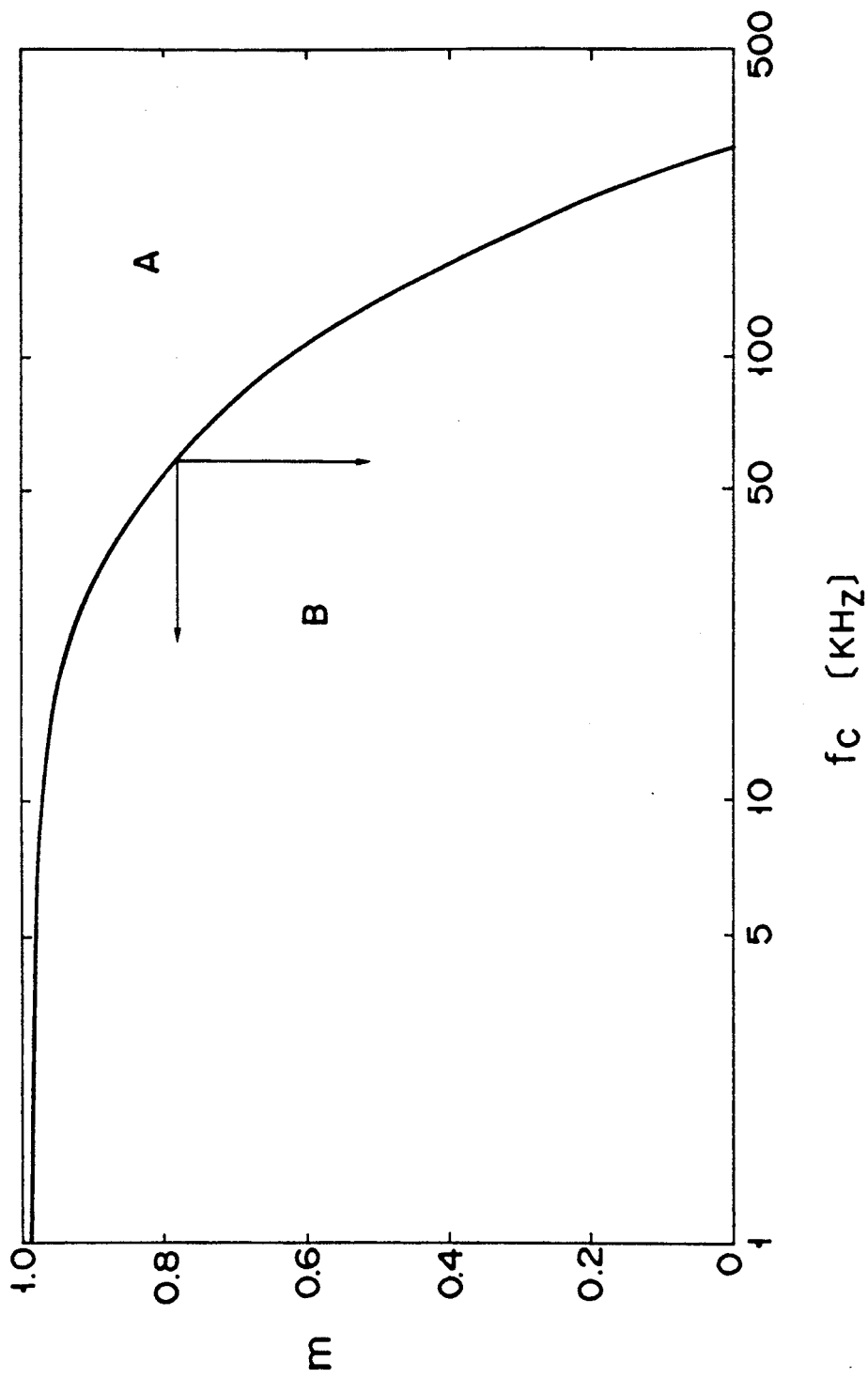

FIG. is a timing chart for explaining an operation of the inverter and the driver;

FIG. 4 is a graph showing the relationship between an ON voltage and a turn-off time of an SI thyristor and an IGBT;

FIGS. 5A to 5F are side sectional views showing structures of an anode of the SI thyristor;

FIG. 6 is a graph showing power conversion efficiency when only a BPT is used, when only an SIT is used, and when the BPT and the SIT are combined, as a switching element used in the inverter;

FIG. 7 is a graph for explaining a decrease in power conversion loss upon combination of high- and low-speed switching elements;

FIG. 8 is a graph showing the relationship between an ON current as a function of an ON voltage of the SIT and the BPT;

FIG. 9, and FIG. 10 are timing charts for explaining a dead time;

FIG. 11 is a timing chart for explaining a problem caused by a dead time and a correction operation therefor;

FIG. 12 is a graph showing an output signal affected by the dead time and an output signal from which an influence of the dead time is eliminated;

FIG. 13 is a graph showing a generation rate of waveform distortion in an output signal due to the influence of the dead time when a modulation frequency is increased;

FIG. 14 is a block diagram showing a circuit for eliminating the influence of the dead time;

FIG. 15 is a side sectional view showing an element structure of the SIT;

FIG. 16 is a circuit diagram showing a single-phase DC-AC inverter constituted by SITs;

FIG. 17 and FIG. 18 are timing charts for explaining minimum pulse widths of ON and OFF pulses defined by a depth of modulation and a triangular wave pulse frequency;

FIGS. 19A and 19B are respectively a diagram and a timing chart for explaining minimum pulse widths of ON and OFF pulses defined among switching elements; and FIG. 20 is a graph showing regions with and without pulse dropout in the relationship between the triangular wave pulse frequency and the depth of modulation.

DETAILED DESCRIPTION OF THE PREFERRED EMBODIMENTS

Figure 1:
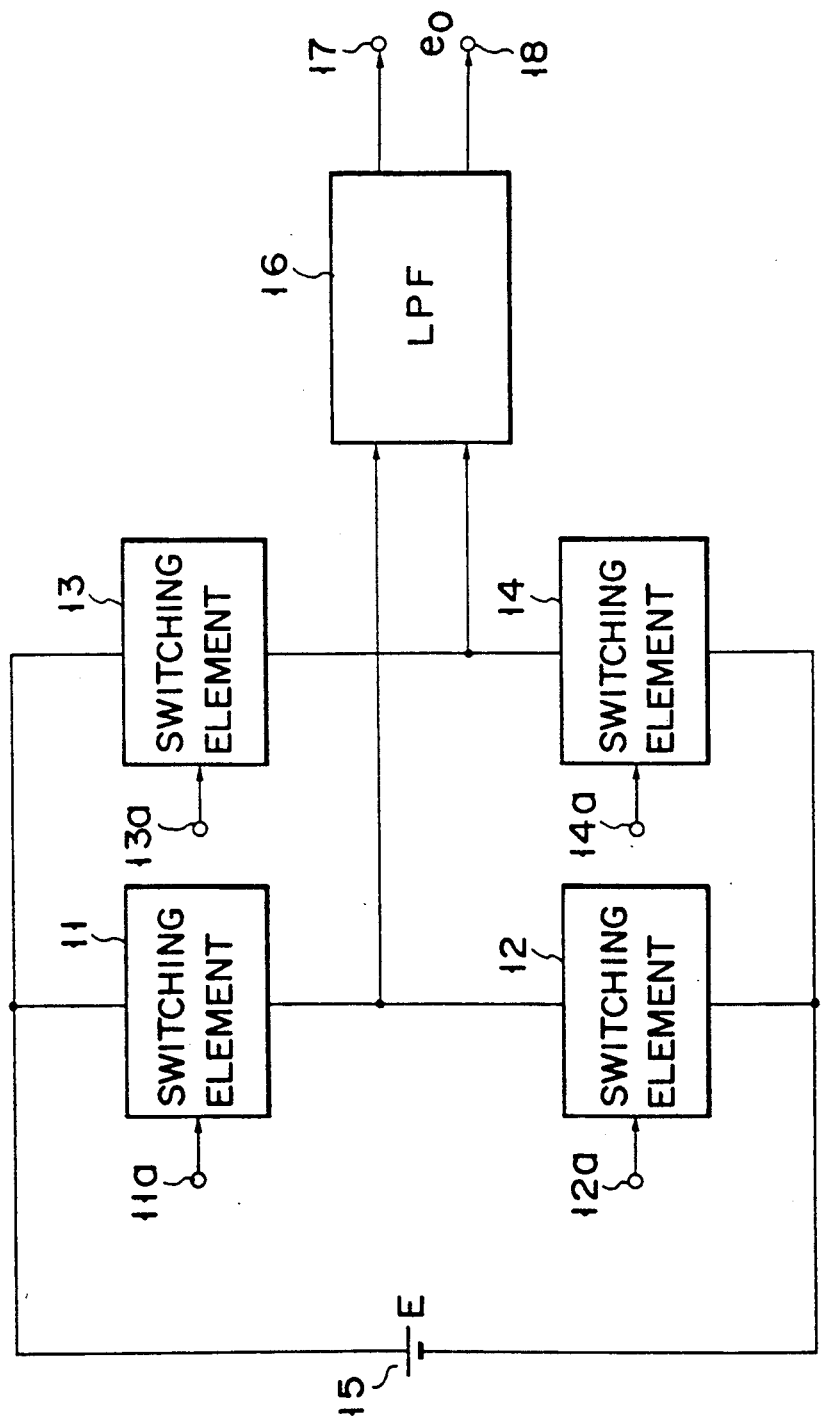
FIG. 1 is a block diagram showing a single-phase DC-AC inverter as an embodiment of a PWM power converter according to the present invention.

An embodiment of the present invention will be described with reference to the accompanying drawings. FIG. 1 shows a single-phase DC-AC inverter as a PWM power converter. More specifically, reference numerals 11 to 14 denote bridge-connected semiconductor switching elements, which are switching-controlled based on PWM signals supplied to control terminals 11a to 14a, respectively.

Constant voltage source 15 is connected between the node between switching elements 11 and 13 and the node between switching elements 12 and 14. Thus, DC voltage E is applied to these elements. The node between switching elements 11 and 12 and the node between switching elements 13 and 14 are respectively connected to output terminals 17 and 18 through LPF (low-pass filter) 16. Output AC voltage e0 can be derived between output terminals 17 and 18.

Figure 2:
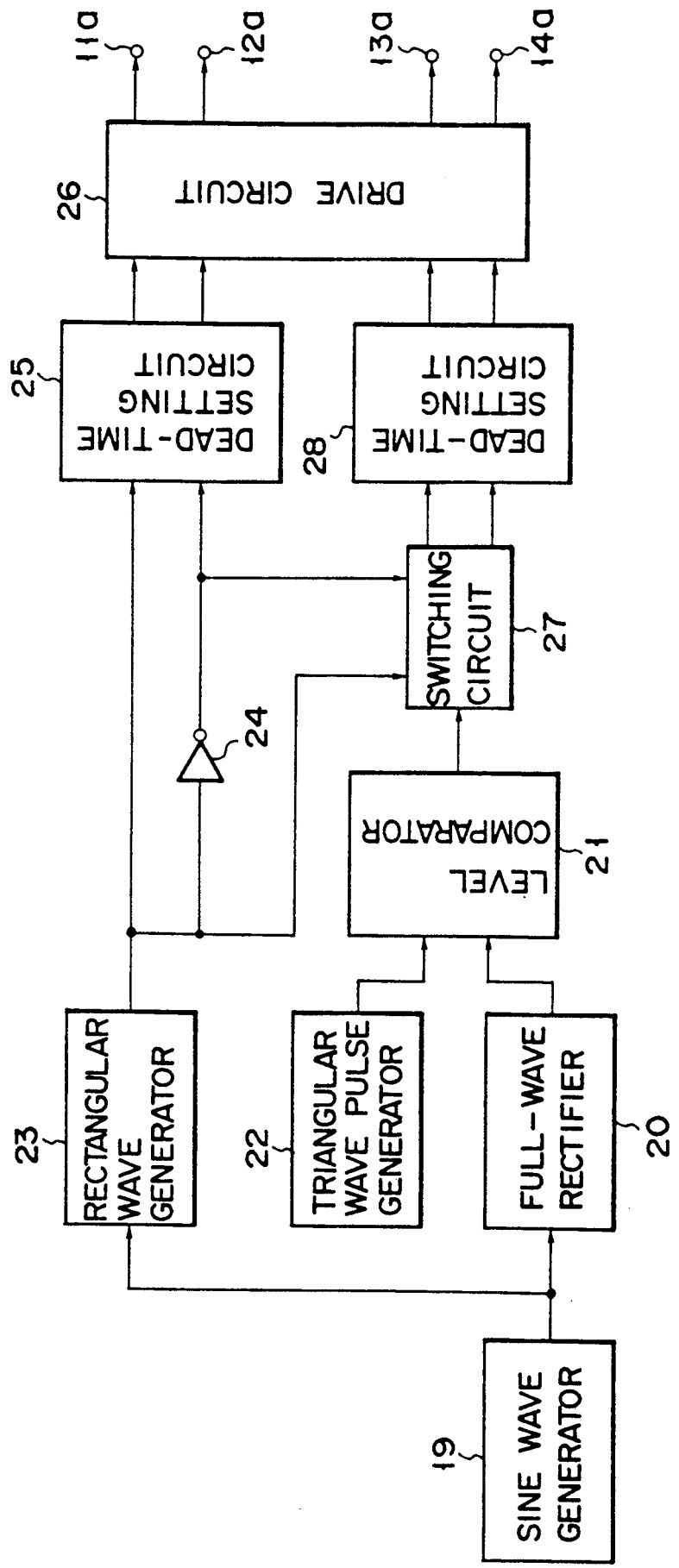
FIG. 2 is a block diagram showing a driver for generating a PWM signal supplied to the inverter.

FIG. 2 shows a driver for generating PWM signals supplied to control terminals 11a to 14a. More specifically, reference numeral 19 denotes a sine wave generator, which can vary a frequency of an output sine wave signal within the range of 30 Hz to 400 Hz. The sine wave signal output from sine wave generator 19 is absolute-value converted by full-wave rectifier 20, as represented by waveform a in FIG. 3A. The obtained signal is input to one input terminal of level comparator 21.

Figure 3:
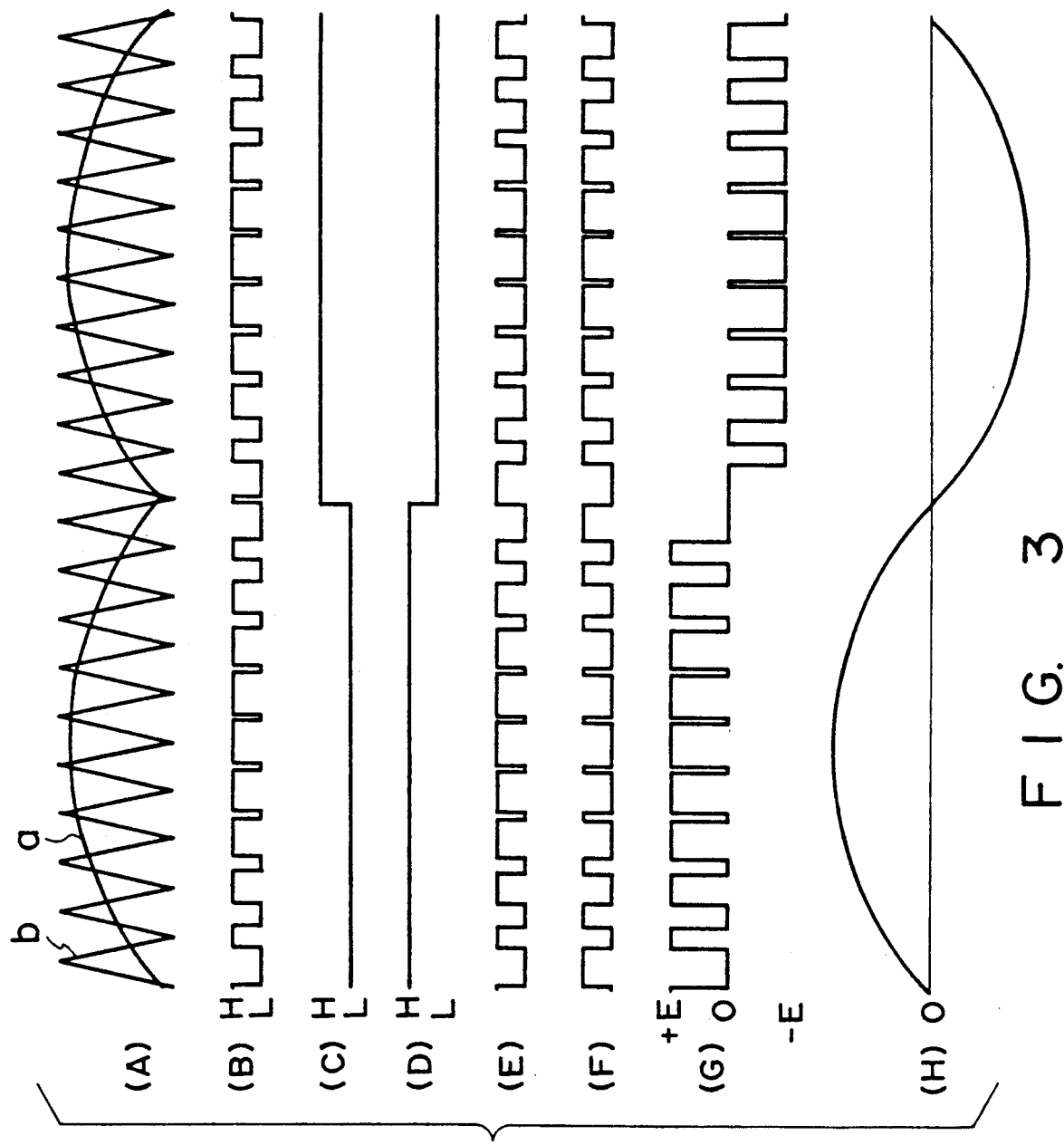

The other input terminal of level comparator 21 receives triangular wave pulses represented by waveform b in FIG. 3A, which are output from triangular wave pulse generator 22. Triangular wave pulse generator 22 can vary the frequency of the generated triangular wave pulse within the range of 10 kHz to 300 kHz.

Level comparator 21 compares levels of the absolute-value converted sine wave signal and the triangular wave pulses, and generates a PWM signal which goes to H (high) level when the sine wave signal level is higher than the triangular wave pulse level and goes to L (low)

level when the sine wave signal level is lower than the triangular wave pulse level, as shown in FIG. 3B.

The sine wave signal output from sine wave generator 19 is supplied to rectangular wave generator 23. Rectangular wave generator 23 generates a low-speed bridge-switching signal which goes to L level when the sine wave signal is positive, and goes to H level when it is negative, as shown in FIG. 3C. The low-speed bridge-switching signal is supplied to control terminal 11a.

The low-speed bridge-switching signal output from rectangular wave generator 23 is inverted by NOT circuit 24, as shown in FIG. 3D, thus generating a low-speed bridge-switching signal supplied to control terminal 12a. The low-speed bridge-switching signals output from generator 23 and NOT circuit 24 are supplied to dead-time setting circuit 25.

Dead-time setting circuit 25 adds a predetermined dead time between the low-speed bridge-switching signals and outputs them to control terminals 11a and 12a via drive circuit 26, so as to prevent switching elements 11 and 12 from being simultaneously turned on and short-circuiting the two terminals of constant voltage source 15. Switching elements 11 and 12 are controlled to be ON when the low-speed bridge-switching signal is at H level, and to be OFF when this signal is at L level.

The PWM signal output from level comparator 21 is supplied to switching circuit 27. Switching circuit 27 inverts the PWM signal supplied from comparator 2 based on the low-speed bridge-switching signals supplied from rectangular wave generator 23 and NOT circuit 24, thus generating PWM signals to be supplied to control terminals 13a and 14a, as shown in FIGS. 3E and 3F.

The PWM signals output from switching circuit 27 are supplied to dead-time setting circuit 28. Circuit 28 adds a predetermined dead time to the PWM signals, so that switching elements 13 and 14 are not simultaneously set in an ON state. Then, the obtained signals are respectively supplied to control terminals 13a and 14a via drive circuit 26. In this case, switching elements 13 and 14 are also controlled to be in an ON/OFF state in accordance with the H/L level of the PWM signals.

Switching elements 11 to 14 are controlled in accordance with the bridge-switching signals shown in FIGS. 3C and 3D and the PWM signals shown in FIGS. 3E and 3F, so that a PWM output shown in FIG. 3G appears between the node between switching elements 11 and 12 and the node between switching elements 13 and 14. The absolute value of the output level is equal to output voltage E of constant voltage source 15.

The output signal shown in FIG. 3G is supplied to LPF 16, and its level is averaged As a result, AC voltage e0 shown in FIG. 3H can be derived between output terminals 17 and 18, thus achieving DC-AC conversion.

Semiconductor switching elements used as switching elements 11 to 14 include BPTs, GTOs, SITs, SI thyristors, MOS transistors, IGBTs, and the like. The characteristics of a variety of semiconductor switching elements will be explained on the basis of detailed numerical data.

In the case of 1,200 V—300 A class SI thyristors for high-frequency applications, which are operated at a frequency of 20 kHz to 100 kHz, an ON voltage is as high as 3 to 5 V, while a tail current and tail time upon switching can be reduced and a turn-off time can be decreased to 1.5 μs or less.

Such data are obtained when lifetime control such as Pt, Au, electron beam radiation, proton radiation, or the like is performed. If no lifetime control is performed, an ON voltage is reduced to 1.5 V or less at 300 A, and the turn-off time is 15 μs to 20 μs (10% to 90%).

More specifically, if the high-speed operation of the 1,200 V—300 A SI thyristor is achieved by lifetime control, an ON voltage is increased However, if no lifetime control is made, the SI thyristor can be an element with a very low ON voltage.

FIG. 4 shows the measurement results of the trade off relationship between ON voltage Von and turn-off time (10% to 90%) of elements having different anode structures. That is, points indicated by o, △, □, ●, ▲, and ■ correspond to SI thyristors having anode structures shown in FIGS. 5A to 5F, respectively.

As is apparent from FIG. 4, the trade off relationship between ON voltage Von and turn-off time toff largely varies depending on the difference in anode structures of the SI thyristors. More specifically, SI thyristors can be suitable as both low-speed, low-ON voltage elements and high-speed elements depending on element designs.

Note that FIG. 4 also shows the trade off relationships between ON voltage Von and turn-off time toff of 1,200 V, 1,700 V, and 1,800 V IGBTs.

Upon comparison between MOS transistors and BPTs, the MOS transistors are suitable as high-speed elements, and the BPTs are suitable as low-speed, low-ON voltage elements. Upon comparison between normally-on type SITs and BPTs, the SITs are suitable as high-speed elements, and the BPTs are suitable as low-speed, low-ON voltage elements. Furthermore, normally-off type SITs are suitable as low-ON voltage elements In other words, the normally-off type SITs require a lower ON voltage than the BPTs, and are capable of high-speed operation.

Upon comparison between SI thyristors and IGBTs, as shown in FIG. 4, in 1,200 V elements, the SI thyristors have the superior trade off relationship between ON voltage Von and turn-off time toff to that of the IGBTs without lifetime control Furthermore, upon comparison between SI thyristors and GTOs for high-power applications, the SI thyristors are suitable as high-speed elements, and the GTOs are suitable as low-speed elements.

Therefore, semiconductor switching elements having the trade off relationships are used at appropriate locations in accordance with element characteristics, thus improving total efficiency of the PWM power converter.

In this embodiment, of four switching elements 11 to 14 constituting DC-AC inverter shown in FIG. 1, switching elements 11 and 12 which perform a low-speed switching operation based on a sine wave signal comprise BPTs, and switching elements 13 and 14 which perform a high-speed operation based on triangular wave pulses comprise SITs.

In this embodiment, the BPTs which have a forward voltage drop, i.e., a low ON voltage of 0.28 V at 20 A, but have a very long turn-off time of 12 μs to 14 μs are used. The SITs which have a high operation speed (no storage time, a turn-on time of 250 ns and a turn-off time of 300 ns) but a relatively high forward voltage drop of 2.3 V (gate-source voltage=0.7 V) at 10 A are used.

FIG. 6 shows the test results of DC-AC power conversion efficiency η when switching elements 11 and 12 comprise BPTs and switching elements 13 and 14 comprise SITs and when all switching elements 11 to 14 comprise either BPTs or SITs. In FIG. 6, power conversion efficiency η is plotted as a function of output AC power PO.

Referring to FIG. 6, a curve of "only BPTs" represents the characteristics of an inverter in which all switching elements 11 to 14 comprise BPTs; a curve of "only SITs" represents the characteristics of an inverter in which all switching elements Il to 14 comprise SITs; and a curve of "combination of SITs and BPTs" represents the characteristics of an inverter in which switching elements 11 and 12 comprise BPTs and switching elements 13 and 14 comprise SITs. In each case, triangular wave pulse frequency fc is 25 kHz, output sine wave frequency f0 is 50 Hz, and depth m of modulation is 0.80.

As can be seen from FIG. 6, the combination of BPTs as low-speed, low ON voltage elements and SITs as elements having higher ON voltage than the BPTs but capable of high-speed operation can provide the best characteristics.

In other words, it is demonstrated that low-speed, low ON voltage elements are preferably used for a low-speed arm constituted by switching elements 11 and 12 which perform a low-speed switching operation, and high-speed switching elements are preferably used for a high-speed arm constituted by switching elements 13 and 14 which perform a high-speed switching operation.

That is, there is always a specific combination of switching elements which can minimize a total loss associated with power conversion depending on selection of switching elements in view of the trade off relationship between ON voltage Von and turn-off time toff.

More specifically, power conversion losses in a high-frequency PWM method of an output frequency of 50 Hz and a triangular wave pulse frequency of 25 kHz are calculated with reference to the switching time and ON resistance of switching elements used in the high-speed arm, in combinations of switching elements used in the low-speed arm having switching time tSW x5 and ON resistance Ron x½ those of high-speed switching elements; x10 and x1/5; x50 and x1/10; x100 and x1/20; and x200 and x1/100, respectively.

The switching count of the low-speed switching elements with respect to that of the high-speed switching elements is 1:250. However, a change in switching loss upon an increase in switching time of the low-speed switching elements increases in proportion to the switching time with respect to reference value 1, as represented by characteristic curve a shown in FIG. 7.

As for the ON resistance of the bridge circuit constituted by switching elements 11 to 14, a change in ON loss due to a decrease in ON resistance of the low-speed switching elements decreases with respect to reference value 1, as represented by characteristic curve b in FIG. 7, due to the series resistances of low- and high-speed switching elements.

As described above, in combinations of x5 switching time and x½ ON resistance; x10 and x1/5; x50 and x1/10; x100 and x1/20; and x200 and x1/100, a change in loss has a minimum loss region (about 23%) with respect to the reference value 1 between the combination of x10 switching time and x1/5 ON resistance and the combination of x50 switching time and x1/10 ON resistance, as represented by characteristic curve c shown in FIG. 7.

In the case of the PWM inverter, triangular wave pulse frequency fc, depth m of modulation, and minimum pulse width Tp determined by turn-on time ton as a switching speed of a switching element, turn-off time toff and dead time td have the following relations:

$$fc = (1-m)2Tp \qquad (1)$$

$$Tp = toff + td + ton + toff + td + ton + \qquad (2)$$

Triangular wave pulse frequency fc determined by equation (1) determines maximum operation frequency fmax.

In the case of the PWM inverter, switching elements which perform a high-speed operation based on triangular wave pulse frequency fc and switching elements which perform a low-speed operation based on a sine wave signal are combined. For this reason, for the switching elements which perform a high-speed operation, since the maximum operation frequency determined by equation (1) must be increased, switching elements capable of high-speed operation are preferably used, and preferably have a low ON voltage. Meanwhile, the switching elements which perform a low-speed operation preferably have a low ON voltage.

FIG. 8 shows characteristics of an ON current as a function of ON voltage of the SIT and BPT used in the PWM inverter. The results shown in FIG. 8 were obtained by measurement while gate current IG of the SIT was set to be 0.1 A and base current IB of the BPT was set to be 0.3 A. The SIT has high high-speed switching performance 10 times or more that of the BPT. However, the SIT has a much higher ON voltage of 2.61 V than that of the BPT at an ON current of 11 A. On the other hand, the BPT has an ON voltage of 0.192 at an ON current of 11 A, and has a lower ON voltage than that of the SIT.

In the above description, a high-frequency inverter combining SITs and BPTs has been exemplified. However, the present invention is not limited to this. For example, high- and low-speed SI thyristors may be combined. In some cases, SI thyristors may be used as elements of low-ON voltage characteristics, and SITs or MOS transistors may be used as high-speed elements.

As combinations of switching elements, GTOs and SI thyristors, IGBTs and MOS transistors, and IGBTs and SITs may be combined. Switching elements of the same type may be combined to obtain an improved total power conversion efficiency if these switching elements have different switching times or ON resistances.

As described above, the low-speed bridge-switching signals supplied to switching elements 11 and 12 are added with a dead time in order to prevent switching elements 11 and 12 from being simultaneously turned on. More specifically, assume that low-speed bridge-switching signals shown in FIGS. 9A and 9B are respectively supplied to switching elements 11 and 12, and switching elements 11 and 12 are turned on when the low-speed bridge-switching signals are at H level. In this case, dead time tb of about 300 ns is set, so that the low-speed bridge-switching signals do not simultaneously go to H level.

PWM signals shown in FIGS. 10A and 10B are respectively supplied to switching elements 13 and 14. If switching elements 13 and 14 are turned on when the PWM signals are at H level, dead time td of about 300 ns is set so that the PWM signals do not simultaneously go to H level, thereby preventing the two terminals of constant voltage source from being short-circuited.

Assume that a sine wave signal represented by waveform a of FIG. 11A is pulse-width modulated by triangular wave pulses represented by waveform b. If intersections of the sine wave signal represented by waveform a and the triangular wave pulses are respectively given as T1 and T2, the PWM signal has pulse width t1 (=T2−T1) from intersection T1 to T2 in proportion to the amplitude level of the sine wave signal represented by waveform a of FIG. 11A, as shown in FIG. 11B.

However, when the PWM signal shown in FIG. 11B passes through dead-time setting circuit 28, the pulse width is decreased by dead time td, i.e., the pulse width is leaned. For this reason, the PWM signal supplied to a switching element has pulse width t2 (=t1−td), as shown in FIG. 11C.

The waveform of output AC signal e0 causes an amplitude level drop, as indicated by a dotted curve in FIG. 12, and regions having an amplitude level "0" appear before and after a zero-crossing point, resulting in a large waveform distortion.

FIG. 13 shows measurement results of a rate of waveform distortion of output AC signal e0 with respect to a triangular wave pulse frequency, i.e., a modulation frequency. As can be apparent from characteristic curve a in FIG. 13, assuming that the frequency of the sine wave signal is 50 Hz, waveform distortion of output AC signal e0 due to a decrease in pulse width (lean of pulse width) is increased when the triangular wave pulse frequency exceeds about 50 kHz.

In this embodiment, as shown in FIG. 14, DC bias voltage Vb is added by adder 29 to the absolute-value converted sine wave signal output from full-wave rectifier 20, thereby level-shifting the sine wave signal. The obtained sine wave signal is supplied to level comparator 21.

With this arrangement, the sine wave signal is offset to a position indicated by waveform c in FIG. 11A with respect to the triangular wave pulses. If intersections between the sine wave signal represented by waveform c and the triangular wave pulses are given as T3 and T4, a PWM signal has pulse width t3 (=T4−T3) from intersection T3 to T4, as shown in FIG. 11D. That is:

$$t3 = t1 + \Delta tb$$

The PWM signal shown in FIG. 11D passes through deadtime setting circuit 28, so that its pulse width is decreased (leaned) by dead time td. Therefore, a PWM signal to be actually supplied to a switching element has pulse width t4 (=t3−td), as shown in FIG. 11E. From t3=t1+Δtb $$t4 = t3 - td$$

we have, $$t4 = t1 + \Delta tb - td$$

For this reason, if DC bias voltage Vb is set so that tb is equal to dead time td, since Δtb=td, then t4=t1. Therefore, a PWM signal for which a decrease (lean) in pulse width due to dead time td is corrected and which has a correct pulse width can be obtained.

Therefore, as indicated by a solid curve in FIG. 12, output AC signal e0 is not largely distorted, and a sine waveform can be obtained. As can be seen from characteristic curve b in FIG. 13 showing the rate of waveform distortion of output AC signal e0 with respect to the triangular wave pulse frequency, assuming that the frequency of the sine wave signal is 50 Hz, an increase in waveform distortion of output AC signal e0 due to a decrease in pulse width (lean of pulse width) is not observed even if the triangular wave pulse frequency is increased up to about 200 kHz.

In this embodiment, DC bias voltage Vb is added to the sine wave signal. However, the present invention is not limited to this. For example, DC bias voltages of different levels can be added to or subtracted from the sine wave signal and the triangular wave pulse signal, respectively, so that a relative DC potential difference is provided between the sine wave signal and the triangular wave pulse.

The above-mentioned SIT has an ultimate short-base, short-channel structure. FIG. 15 shows an N-channel SIT element structure. More specifically, when a negative voltage is applied to gate G, a depletion layer extends to central line 1 of the channel, resulting in a pinch-off state. If a zero or low positive voltage is applied to gate G, the channel is opened to turn on the element.

The SIT has small capacitance Cg per unit area between gate G and source S due to its short-channel structure, and also has very small source resistance Rs. Thus, since gate time constant CgRs can be set to be very small, the SIT is best suited for high-speed switching.

FIG. 16 is a circuit diagram showing a single-phase DC-AC inverter using the SITs. LPF 16 is constituted by coils L1 and L2 and capacitor C1. Capacitor C2 is connected in parallel with constant voltage source 15.

Assume that a sine wave signal represented by waveform a in FIG. 17A is pulse-width modulated by a triangular wave pulse signal represented by waveform b. An output signal shown in FIG. 17B appears across the node between switching elements 11 and 12 and the node between switching elements 13 and 14, as described above, and output AC signal e0 shown in FIG. 17C can be obtained from LPF 16.

In this case, of pulses which turn on switching elements 13 and 14 (to be referred to as ON pulses hereinafter), ON pulse Pon having a minimum pulse width is present near the zero-crossing point of output AC signal e0. Of pulses which turn off switching elements 13 and 14 (to be referred to as OFF pulses hereinafter), OFF pulse Poff having a minimum pulse width is present near a maximum crest of output AC signal e0.

A ratio of an absolute value of maximum level Vs of a sine wave signal to an absolute value of maximum level Vc of a triangular wave pulse signal ( |Vs/Vc| ) is given as depth m of modulation, and a period of triangular wave pulses is given as Tc, as shown in FIG. 18A. In this case, minimum pulse width Tp of ON and OFF pulses Pon and Poff is represented by:

$$Tp = (1-m)Tc/2$$

FIG. 19A simply illustrates switching elements 13 and 14, and FIG. 19B shows PWM signals supplied to switching elements 13 and 14. The minimum pulse width of OFF pulse Poff which is returned from an ON region to an ON region, and the minimum pulse width of ON pulse Pon which is returned from the OFF region to the OFF region are represented by the sum of turn-on time ton and turn-off time toff of switching elements 13 and 14. In consideration of dead time tb when the ON/OFF states of switching elements 13 and 14 are altered, required minimum pulse width tp of ON and OFF pulses Pon and Poff is given by:

$$tp = toff + td + ton + toff + td + ton$$

where the length of flat portion 30 of a PWM signal is assumed to be zero.

For this reason, if the relation between minimum pulse width Tp of ON and OFF pulses Pon and Poff defined by depth m of modulation and period Tc of a triangular wave pulse signal, and required minimum pulse width tp of ON and OFF pulses Pon and Poff defined between switching element 13 and 14 becomes:

$$Tp < tp$$

Then, pulse dropout occurs, and fidelity of output AC signal e0 with respect to an input signal is impaired near the zero-crossing point and the maximum crest.

A condition for preventing the pulse dropout is represented by:

$$Tp \geq tp$$

A critical condition with which no pulse dropout occurs is:

$$Tp = tp$$

Therefore, the relationship between critical depth m of modulation with which no pulse dropout occurs and triangular wave pulse frequency fc is set in accordance with required minimum pulse width tp defined between switching elements 13 and 14 as follows:

$$fc = (1 - m)/2tp$$

Required minimum pulse width tp when SITs are used as switching elements is:

$$tp = 300 + 300 + 250 + 300 + 300 + 250$$
$$= 1,700 \text{ ns}$$

FIG. 20 shows measurement results of pulse dropout region A and stable operation region B for which no pulse dropout occurs based on the relationship between depth m of modulation and triangular wave pulse frequency fc. In this case, if dropout of ON and OFF pulses of an output voltage is observed while depth m of modulation is fixed to be 0.8 and triangular wave pulse frequency fc is changed, ON/OFF pulse dropout is observed from 58 kHz corresponding to frequency fc at which the pulse dropout occurs and is calculated from the above equation.

Therefore, when a stable operation region free from pulse dropout upon an increase in triangular wave pulse frequency fc is selected, turn-on time ton, turn-off time toff, and dead time td of switching elements are determined. Then, the relationship between critical depth m of modulation and triangular wave pulse frequency fc free from pulse dropout is determined. Therefore, fidelity of output AC signal e0 can be prevented from being impaired near the zero-crossing point and the maximum crest with respect to an input signal.

The present invention may be applied to single-phase and multi-phase AC-DC converters, forward/reverse converters, active filters, and the like as well as a single-phase DC-AC inverter.

We claim:

1. A PWM power converter comprising:
   a plurality of bridge-connected semiconductor switching elements, including predetermined ones of which are switched at low speed and predetermined others which are switched at low speed and predetermined others which are switched at high speed; and
   PWM signal generating means for comparing levels of a signal wave and a modulated wave, and generating PWM signals for switching said plurality of semiconductor switching elements, in order,
   wherein a bipolar transistor which has a structure with a low ON voltage and a small conduction loss is used for those of said plurality of semiconductor switching elements which are switched at a low speed, and a static induction transistor which has a structure with an ON voltage higher than that of said bipolar transistor, a low switching loss and a capability of high-speed switching, is used for the others of said plurality of semiconductor switching elements which are switched at a high speed, said bipolar transistor having a switching time 10 to 50 times greater than that of the static induction transistor and an ON resistance 1/5 to 1/10 that of the static induction transistor.

2. A PWM power converter according to claim 1, further comprising:
   dead-time setting means for adding a dead time to each PWM signal generated by said PWM signal generating means so that elements, connected in series with a power supply, of said plurality of semiconductor switching elements are not simultaneously turned on; and
   level shift means for providing a DC level difference to the signal wave and the modulated wave.

3. The PWM power converter according to claim 2, wherein the DC level difference between the signal wave and the modulated wave is large enough to widen a pulse width of each PWM signal generated by said PWM signal generating means by a pulse width decreased by said dead-time setting means.

4. A PWM power converter according to claim 1, further comprising:
   dead-time setting means for adding a dead time to each PWM signal generated by said PWM signal generating means so that elements, connected in series with a power supply, of said plurality of semiconductor switching elements are not simultaneously turned on,
   wherein said switching elements are operated in a range where a minimum pulse width of the PWM signal defined by a depth of modulation and the modulation frequency is not decreased below a minimum pulse width of the PWM signal defined by a turn-on time, a turn-off time, and a dead time of said switching elements.

* * * * *